United States Patent [19]
Burns

[11] Patent Number: 6,035,807
[45] Date of Patent: *Mar. 14, 2000

[54] CATTLE SCRUBBER APPARATUS

[76] Inventor: Kevin Lee Roy Burns, HCR 1, Box 47B, Spearman, Tex. 79081

[*] Notice: This patent is subject to a terminal disclaimer.

[21] Appl. No.: 08/252,736

[22] Filed: Jun. 2, 1994

[51] Int. Cl.$^7$ .................................................. A01K 13/00
[52] U.S. Cl. ........................................... 119/652; 119/661
[58] Field of Search ............................. 119/51.01, 51.03, 119/157

[56] References Cited

U.S. PATENT DOCUMENTS

| | | | |
|---|---|---|---|
| 1,129,977 | 3/1915 | Hagny | 119/157 |
| 1,220,441 | 3/1917 | Mendel | 119/157 |
| 1,297,586 | 3/1919 | Nordmann | 119/157 |
| 1,302,979 | 5/1919 | Schipper | 119/157 |
| 2,688,950 | 9/1954 | McKinley | 119/157 |
| 2,690,162 | 9/1954 | Kremer | 119/157 |
| 2,777,421 | 1/1957 | Hiebert | 119/157 |
| 3,137,274 | 6/1964 | Palmer | 119/157 |
| 3,187,722 | 6/1965 | Gilmore et al. | 119/157 |
| 3,202,132 | 8/1965 | Lentz et al. | 119/157 |
| 3,306,264 | 2/1967 | Berens | 119/157 |
| 3,677,233 | 7/1972 | White, Jr. | 119/157 |
| 3,831,559 | 8/1974 | Hinrichs | 119/157 |
| 4,091,767 | 5/1978 | Montgomery | 119/157 |
| 4,324,202 | 4/1982 | Stonestreet et al. | 119/61 X |
| 5,367,983 | 11/1994 | Pound et al. | 119/157 X |

*Primary Examiner*—Robert P. Swiatek
*Attorney, Agent, or Firm*—Novak Druce & Burt

[57] ABSTRACT

A cattle scrubber comprising a frame which defines a geometrically shaped treatment zone, a cylindrical feeder barrel located in each corner of the treatment zone, and an elongated, flexible livestock insecticide applicator, which extends around the periphery of the treatment zone. The frame comprises a plurality of interconnected, elongated rigid ground engaging members which intersect at their ends to define the geometrically shaped treatment zone, and a plurality of rigid, elongated upstanding members, one of which is located at each corner intersection of the ground engaging members. Each feeder barrel is located near one of the upstanding members and provided with a feeder opening which is arranged to face inward into the treatment zone. An arcuate bracket member attached to each of the upstanding members is shaped to engage against the cylindrical sidewall of the feeder barrel. A rigid brace member extends angularly between each pair of transverse, intersecting ground engaging members near each corner intersection. The feeder barrels are retained in position, with their feeder openings facing inward into the treatment zone, by fastening the feeder barrels to the bracket members and the brace members. The insecticide applicator is suspended in an arc above the ground between the upper ends of each opposing pair of upstanding members. The insecticide applicator encloses the feeder barrels within the treatment zone such that the cattle must step under and brush against the applicator in order to obtain feed from the feeder barrel.

19 Claims, 3 Drawing Sheets

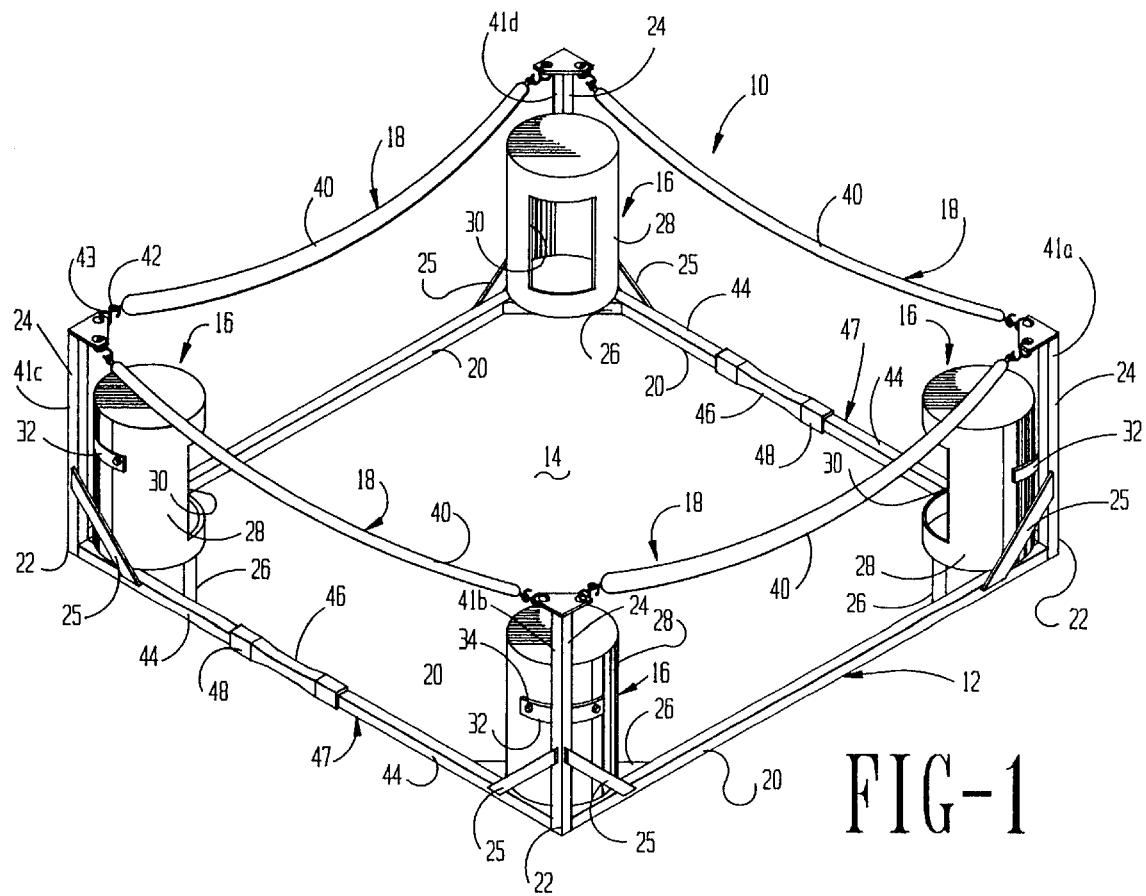
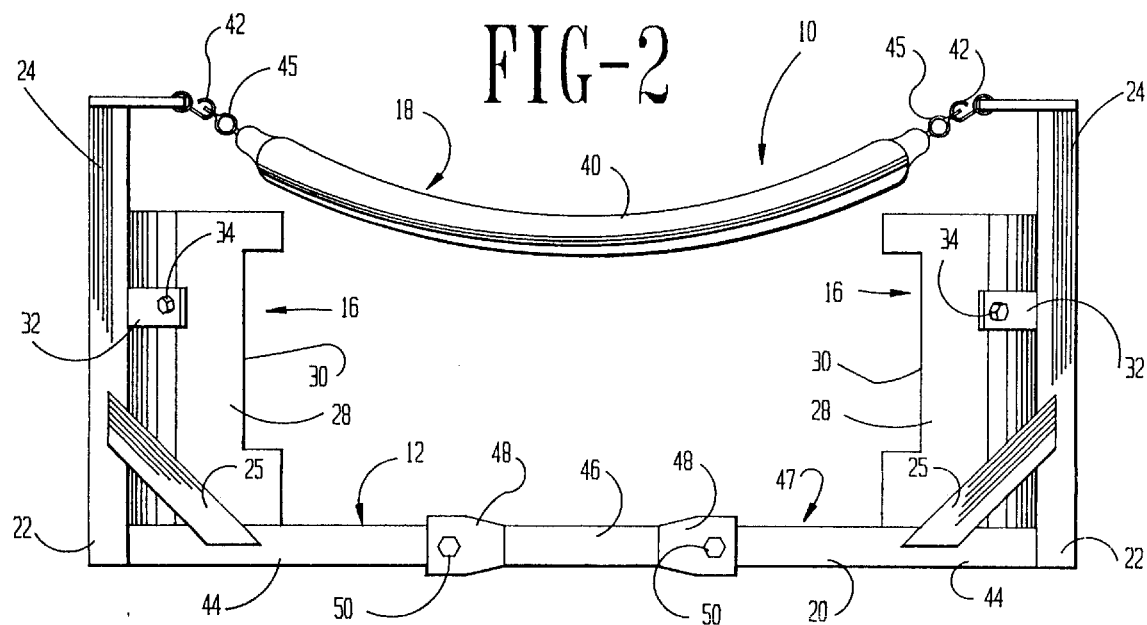

CATTLE SCRUBBER APPARATUS

BACKGROUND OF THE INVENTION

1. Field of Invention

This invention relates to treating material applicators for livestock, and more particularly to such an applicator which is supported on a structure defining a geometric figure.

2. Description of the Background

Insects, including lice, grub worms and in particular flies, are attracted to animals, and the problem is particularly acute with respect to cattle. The flies can cause severe irritation to the animal, pink eye blindness in one or both eyes and even the death of the animal. Further, as with another discomfort, the animal does not grow as rapidly or additionally, or in the case of milk cows, give as much milk Heretofore many attempts have been made to solve the insect problem in the cattle industry, but none has been found to be completely satisfactory. For instance, the insecticide dispenser may be satisfactory, but it may prove difficult to have cattle utilize the device.

SUMMARY OF INVENTION

Therefore, it is a primary aim of the present invention to provide cattle scrubber apparatus which encloses a geometrically shaped treating zone containing feeder barrels to which cattle are attracted, and which the cattle must step under and brush against an elongated insecticide applicator suspended around the periphery of the treating zone in order to reach the feeder barrels. In accordance with this aim, the feeder barrels are attached inside the insecticide applicator to the frame of the cattle scrubber with their feeder openings facing the center of the treating zone so that the cattle cannot accidentally topple the feeder barrels outside of the treating zone, or disorient the feeder openings from facing the center of the treating zone. In this manner, the cattle are required to step under and brush against the elongated insecticide applicator in order to access the contents of the feeder barrels.

Another aim of the present invention is to provide cattle scrubber apparatus which can be easily disassembled and moved to treat cattle at other locations. In accordance with this aim, extension joints are provided which allow the cattle scrubber to be disassembled into smaller units, which can be easily transported to other areas.

These and other aims of the present invention will become apparent from the following description, when taken in conjunction with the drawings which accompany, and form part of, this specification.

BRIEF DESCRIPTION OF THE DRAWINGS

FIG. 1 is a pictorial view of the cattle scrubbing apparatus according to the present invention;

FIG. 2 is a side view of the cattle scrubbing apparatus illustrated in FIG. 1;

DESCRIPTION OF THE PREFERRED EMBODIMENTS

Figure 3:
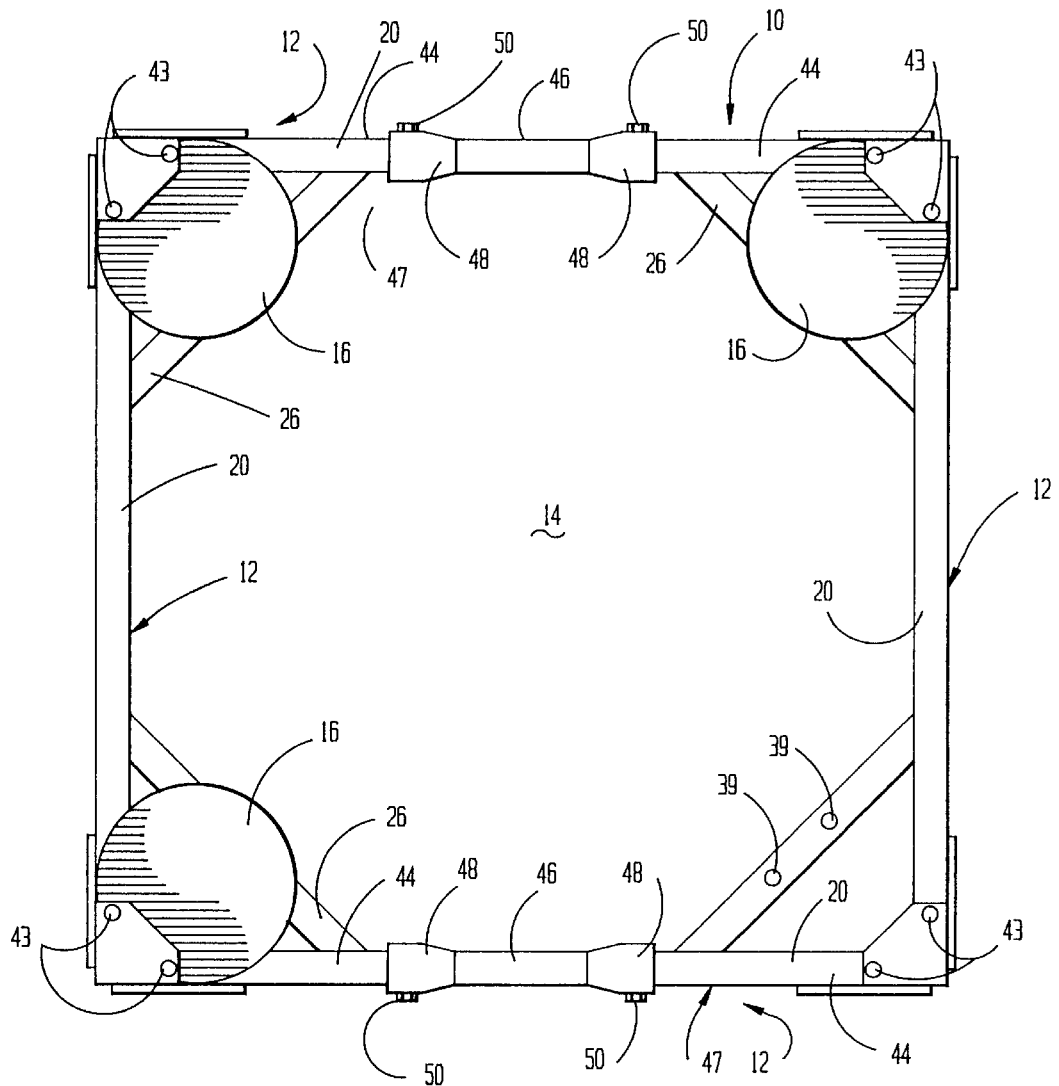
FIG. 3 is a top view of the cattle scrubbing apparatus illustrated in FIG. 1.

Referring to FIG. 1, the animal scrubber apparatus according to the present invention is illustrated generally as 10. Animal scrubber 10 comprises a frame 12 which defines a geometrically shaped treatment zone 14, a plurality of feeder barrels 16, and an elongated, flexible livestock insecticide applicator 18, which is suspended in an arc around the periphery of frame 12 and which encloses treatment zone 14. Frame 12 includes a plurality of interconnected, elongated rigid ground engaging members 20 which intersect at their ends to define the geometrically shaped treatment zone 14. Ground engaging members 20 may be provided in the form of square steel tubing, such as 1½ inch square tubing, and which is welded, for example, and braced at each corner 22. As illustrated in the Figures, the number of ground engaging members 20 may total four which are interconnected to define a rectangularly shaped treatment zone. Further, each of the ground engaging members 20 may be of an equal length, for example 10 feet, such that the interconnected ground engaging members 20 define a square shaped treatment zone. Of course, it is also within the scope of the invention that other numbers of ground engaging members 20 may be utilized which define other geometrically shaped treatment zones, such as triangularly shaped treatment zones.

Also included with frame 12 are a plurality of rigid, but elongated upstanding members 24, one of which is located at each corner intersection 22 of grounding engaging members 20. Upstanding members 24 may be provided in the form of, for example, 1½ inch steel tubing, which are attached to ground engaging members 20 by, for example, welding their lower end portions to the corner intersection of ground engaging members 20. Referring to the Figures, the number of upstanding members 24 may total four, each of which, for example, may stand 48 inches tall. For milk cows, each upstanding member 24 may be 54 inches tall. A brace 25 may be included which extends angularly between each upstanding member 24 and ground engaging members 20 to retain upstanding members 24 in their generally vertical position. Each brace 25 may, for example, be formed of ¼ inch steel which is 1½ inches wide and which measures 3 inches long.

Referring to FIG. 3 for details, frame 12 may further include a plurality of rigid brace members 26, one of which extends angularly between each pair of intersecting ground engaging members 20 near, but spaced somewhat from corner 22 to define a triangle. Each brace member 26 may be provided in the form of, for example, square steel tubing, such as 1½ inch square tubing, which is provided with angular end cuts and welded, for example, between intersecting ground engaging members 20.

Figure 4:
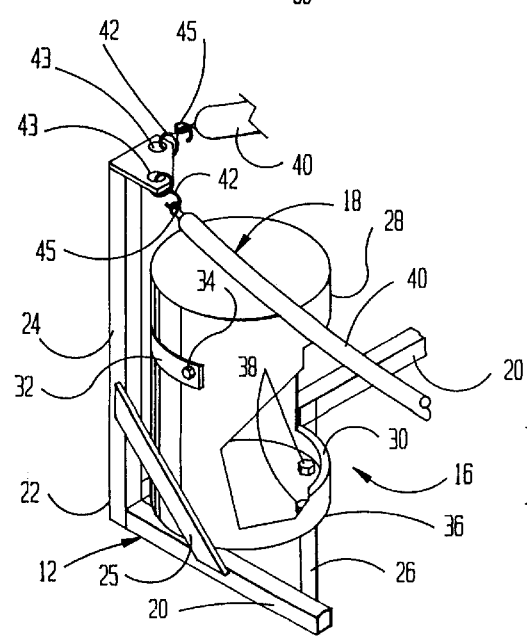
FIG. 4 is a detailed, partially broken away, pictorial view of the feeder barrel of the cattle scrubbing apparatus illustrated in FIG. 1.

Feeder barrels 16 are located inside frame 12 within treatment zone 14. Referring to FIG. 4 for details, one feeder barrel 16 is located at each of the corner intersections 22 of ground engaging members 20 near upstanding member 24. Each feeder barrel 16 may be provided in the form of, for example, a vertical, upstanding 55 gallon drum. Preferably, feeder barrels 16 are formed of a rust inhibitive material such as polypropylene, which restrains feeder barrels 16 from rusting or corroding when exposed to the elements while protecting the contents within from wind and rain. So that cattle may access the contents of feeder barrels 16, the cylindrical sidewall portion 28 of each feeder barrel 16 is provided with a large, somewhat, for example, rectangularly shaped feeder opening 30. Referring to FIG. 3, feeder barrels 16 are preferably arranged so that feeder openings 30 face toward the center of treatment zone 14. Feeder barrels 16 are configured to hold as much as 200 pounds of salt, minerals or, for example, protein, hereafter termed for simplicity feed.

Figure 5:
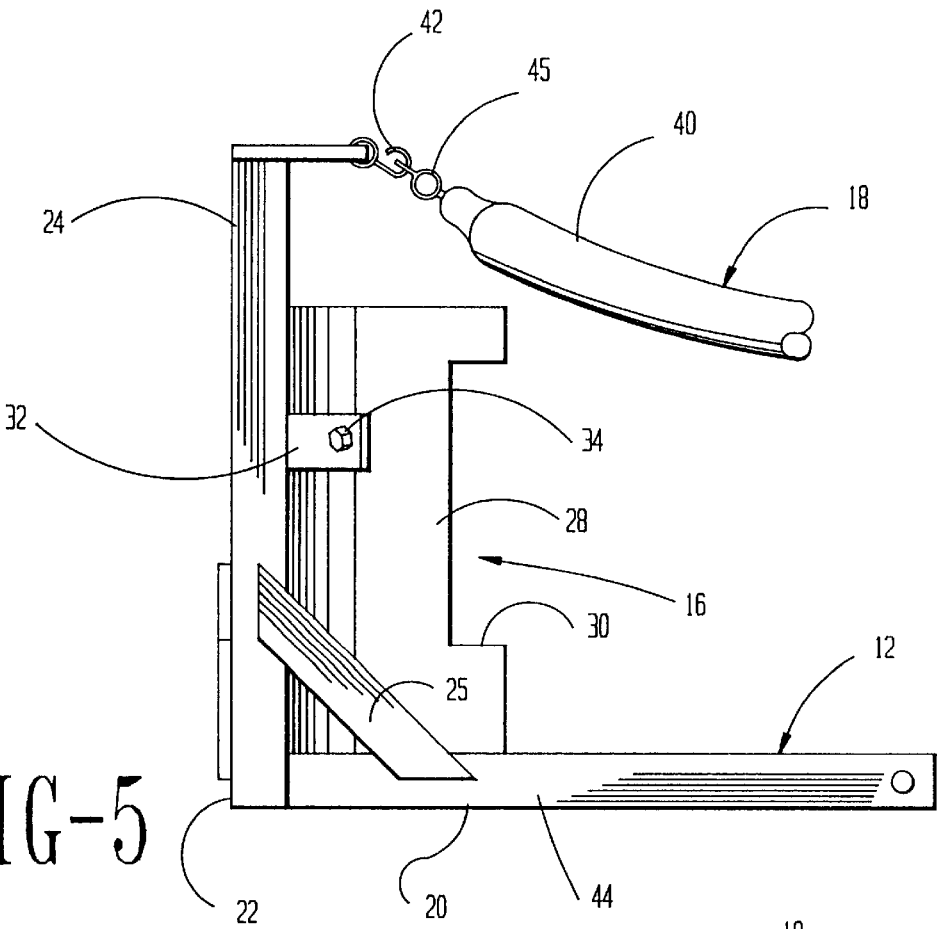
FIG. 5 is a side view of a detail of the frame of the cattle scrubbing apparatus illustrated in FIG. 1, illustrating an end post bracket arrangement for attaching the feeder barrel to the frame.
Figure 6:
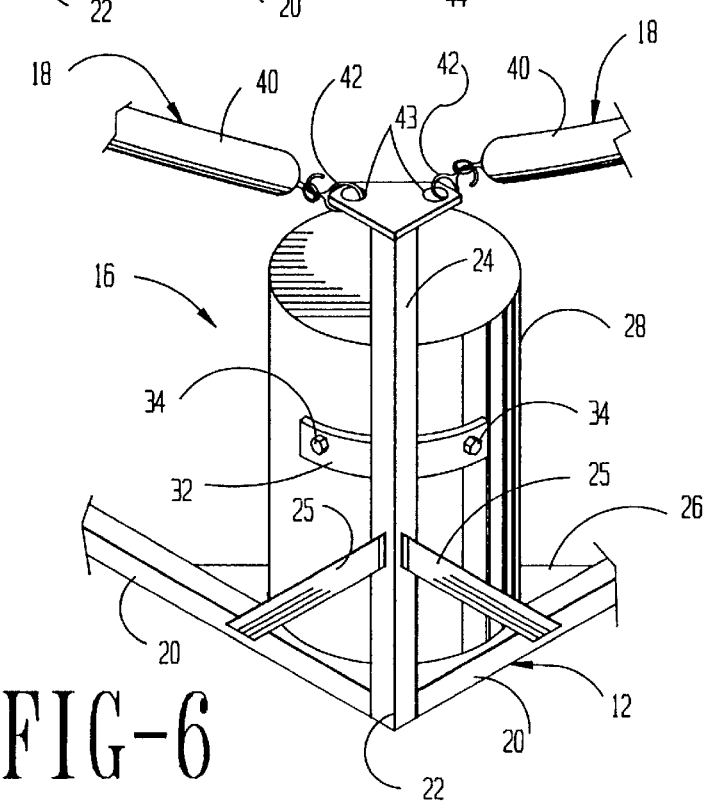
FIG. 6 is a rear, detailed pictorial view of the feeder barrel, showing the feeder barrel attached to the frame of the cattle scrubbing apparatus illustrated in FIG. 1.

Referring again to FIGS. 1, 4 and 5, bracket means is included on each upstanding member 24. Bracket means attaches feeder barrels 16 to frame 12 so that feeder barrels 16 are retained within treatment zone 14, and prevented from being knocked outside treatment zone 14 by the movement of cattle in and out of treatment zone 14. Bracket means may be provided in the form of arcuate bracket members 32, one of which is attached generally transversely across each upstanding member 24 by suitable means such as bolts or welding, and which is arranged to face toward the center of treatment zone 14. Bracket members 32 may be formed of a rigid material such as steel, and each arcuate bracket member 32 is shaped to engage against cylindrical sidewall 28. Each bracket member 32, for example, may be formed of ¼ inch steel, which is 1½ inches wide and which measures 8 inches along its arcuate length. Fastener means in the form of, for example, self tapping screws 34 attach feeder barrels 16 to arcuate bracket members 32. As best illustrated in FIG. 4, feeder barrels 16 rest on brace members 26. To retain the bottom portion 36 of feeder barrels 16 in position on brace members 26, fastener means in the form of self-tapping screws or bolts 38, which engage spaced bores 39 in brace members 26, attach bottom portion 36 of feeder barrels 16 to brace members 26.

Referring to FIG. 1, elongated, flexible livestock insecticide applicator 18 is suspended in an arc around the periphery of frame 12 to enclose treatment zone 14. As illustrated in FIG. 1, insecticide applicator 18 may be provided in elongated segments 40, each of which is attached between opposing pairs 41a and 41b, 41b and 41c, 41c and 41d, 41d and 41a of upstanding members 24. In order that the insecticide applicator 18 hangs in an arc between opposing pairs of upstanding members 24, each segment 40 thereof may be somewhat longer than the ground engaging member lying below. In order to hang each segment 40 of applicator 18 between opposing pairs of upstanding members 24, each upstanding member 24 is provided with an S-shaped hook 42, to which one end of elongated segment 40 is attached, thus allowing elongated segment 40 of insecticide applicator 40 to hang downward in an arc. S-shaped hook 42 may be attached to upstanding member 24 by hooking one end of S-shaped hook 42 through an opening 43 formed adjacent the upper end of upstanding member 24. To attach elongated segments 40 between opposing S-shaped hooks 42, each segment 40 is provided with, for example, loops 45 at opposite end portions thereof, through which the hooked ends of S-shaped hook 42 are hooked, thus allowing each elongated segment 40 to hang in a somewhat loose arc between opposing pairs 41a and 41b, 41b and 41c, 41c and 41d, 41d and 41a of upstanding members 24. As may be appreciated, the length of S-shaped hooks 42, which displace the ends of segments 40 apart from upstanding members 24, allows applicator segments 40 to have a length substantially the same as the length of ground engaging members 20, while allowing each elongated segment 40 to hang in an arc between opposing pairs 41a and 41b, 41b and 41c, 41c and 41d, 41d and 41a of upstanding members 24. Consequently, for a 10 foot square embodiment of cattle scrubber 10 employing S-shaped hooks 42, each elongated segment 40 of insecticide applicator 18 may measure, for example, 10 feet in length.

Insecticide applicator 18, and its segments 40 thereof, may be provided in the form of a rope like material which is impregnated with various insecticides to provide the cattle rub. One preferable form of insecticide applicator 18 is Cow-life cattle rubs. A cable or wire over which is wrapped burlap or other highly absorbent material, which is charged with a quantity of insecticide mixture whether fluid or powder, can also be utilized to provide insecticide applicator 18. An insecticide applicator rope such as described in U.S. Pat. No. 3,677,233 can also be utilized with the present invention.

Referring to FIG. 2 for details, frame 12 may also include removable expansion means for converting at least two ground engaging members 20 into a pair of shortened members 44. Removable expansion means may be provided in the form of an extension joint 46, which may be provided in varying lengths to vary the length of ground engaging members 24. Each extension joint 46 may be formed, for example, of elongated square tubing, which is provided with enlarged square opposite end portions 48 into which the facing end portions of shortened members 44 may be inserted to form an elongated, rigid ground engaging member. In order to prevent shortened members 44 from becoming disconnected from extension joint 46, enlarged end portions 48 of extension joint 46 and facing end portions of shortened members 44 are provided with bores which intersect when the facing ends of shortened members 44 are inserted into enlarged end portions 48. A pin in the form of a bolt 50 extends through each pair of aligned bores to lock shortened members 44 and extension joint 46 in place, forming elongated ground engaging member 47. The removable extension joints 46 allows cattle scrubber 10 to be disassembled by one man and moved to another location, which is advantageous for cattle owners who need to treat cattle in various remote areas of their ranch. The relatively small components into which cattle scrubber 10 can be broken down into allows one person to disassemble cattle scrubber 10 and move cattle scrubber 10 to another location. Advantageously, this will help prevent cattle from stomping out holes around the waterhole.

In use, cattle scrubber 10 is assembled at the desired cattle treating site. Insecticide applicator 18 encloses treating zone 14, in which feeder barrels 16 are located and arranged therein with their feeder openings 30 facing toward the center of treating zone 14. The cattle near the assembled cattle scrubber 10 are attracted to the contents of feeder barrels 16. In order for the cattle to have access to the contents of feeder barrels 16, the cattle must step over or under insecticide applicator 18, brushing against insecticide applicator 18 as they cross over into treating zone 14. Once inside, the cattle continue to brush against insecticide applicator 18 as they feed and move around treating zone 14, brushing against insecticide application 18 due to the itch generated by biting and sucking insects. Arcuate bracket members 32 and brace members 26, to which feeder barrels 16 are fastened, prevent the cattle from knocking feeder barrels 16 outside treating zone 14, and prevent the cattle from disorienting feeder openings 30 from facing toward the center of treating zone 14, thus assuring that the cattle must step under and brush against insecticide applicator 18 to have access to the contents of feeder barrels 16. Thus, the cattle are enabled to rid themselves of flies, other insects and parasites. After use, bolts 50 can be removed and cattle scrubber 10 disassembled and moved to another location for treatment of cattle at another location.

As various changes can be made in the above described embodiments without departing from the spirit and scope of the invention, it is intended that all matter contained in the above description or shown in the accompanying drawings shall be interpreted as illustrative and not in a limiting sense.

What is claimed is:

1. Cattle scrubber apparatus, comprising:

a frame having a plurality of interconnected, elongated rigid ground engaging members which intersect at their ends to form a treatment zone, and a plurality of rigid, but elongated upstanding members, one of said upstanding members being located at each intersection of said ground engaging members;

a feeder barrel located in said treatment zone at each intersection of said ground engaging members near each upstanding member; and an elongated, flexible livestock insecticide applicator suspended in an arc above the ground between each opposing pair of said upstanding members, said insecticide applicator extending around the periphery of said treatment zone to enclose the feeder barrels therein such that the cattle must step under and brush against the insecticide applicator in order to obtain feed from the feeder barrel.

2. Cattle scrubber apparatus of claim 1, wherein said plurality of interconnected ground engaging members is four, and wherein said plurality of ground engaging members are interconnected at their ends to form substantially a rectangular shape, each intersection of said ground engaging members forming a corner.

3. Cattle scrubber apparatus of claim 2, wherein said frame further includes a rigid brace member that extends angularly between each pair of transverse, intersecting ground engaging members near each corner.

4. Cattle scrubber apparatus of claim 2, wherein said rectangular shape is square.

5. Cattle scrubber apparatus of claim 1, wherein said feeder barrel has an upstanding cylindrical sidewall, said feeder barrel having a feeder opening in said cylindrical sidewall positioned to face inward toward the center of said treatment zone.

6. Cattle scrubber apparatus of claim 1, wherein said apparatus further comprises bracket means on each of said upstanding members, said bracket means attaching said feeder barrels within said treatment zone.

7. Cattle scrubber apparatus of claim 6, wherein each feeder barrel has an upstanding cylindrical sidewall, and wherein said bracket means includes an arcuate bracket member shaped to engage against said cylindrical sidewall, and fastener means to attach said feeder barrel to said arcuate bracket member.

8. Cattle scrubber apparatus of claim 7, wherein the arcuate bracket members extend generally transversely across said upstanding members.

9. Cattle scrubber apparatus of claim 1, wherein said frame further includes removable expansion means for converting at least two of said elongated, rigid ground engaging members into a pair of shortened members, said expansion means when assembled longitudinally between each pair of said shortened members forming said shortened members into an elongated, rigid ground engaging member.

10. Cattle scrubber apparatus, comprising:

a frame having a plurality of interconnected, elongated rigid ground engaging members which intersect at their ends to form a geometrically shaped treatment zone, and a plurality of rigid, but elongated upstanding members, one of said upstanding members being located at each corner intersection of said ground engaging members;

a feeder barrel located in said treatment zone at each corner intersection of said ground engaging members near each upstanding member, each of the feeder barrels having a feeder opening therein arranged to face inward into said treatment zone;

bracket means on each of said upstanding members to attach said feeder barrels in said corner intersections within said treatment zone; and an elongated, flexible livestock insecticide applicator suspended in an arc above the ground between the upper ends of each opposing pair of upstanding members, said insecticide applicator extending around the periphery of said treatment zone to enclose said feeder barrels therein such that the cattle must step under and brush against the insecticide applicator in order to obtain feed from the feeder barrel.

11. Cattle scrubber apparatus of claim 10, wherein said geometrically shaped treatment zone is rectangular.

12. Cattle scrubber apparatus of claim 10, wherein said frame further includes a rigid brace member that extends angularly between each pair of intersecting ground engaging members near each corner.

13. Cattle scrubber apparatus of claim 10, wherein each feeder barrel has an upstanding cylindrical sidewall, and wherein said bracket means includes an arcuate bracket member shaped to engage against said cylindrical sidewall, and fastener means to attach each feeder barrel to said arcuate bracket member.

14. Cattle scrubber apparatus of claim 13, wherein the arcuate bracket members extend generally transverse across said upstanding members.

15. Cattle scrubber apparatus of claim 14, wherein said frame further includes a rigid brace member that extends angularly between each pair of transverse, intersecting ground engaging members below each feeder barrel and near each corner intersection, and wherein said apparatus further comprises second fastener means for attaching the feeder barrels to the brace members.

16. Cattle scrubber apparatus of claim 10, wherein said frame further includes removable expansion means for converting at least two of said elongated, rigid ground engaging members into a pair of shortened members, said expansion means when assembled longitudinally between each pair of said shortened members forming said shortened members into an elongated, rigid ground engaging member.

17. Cattle scrubber apparatus, comprising:

a frame having a plurality of interconnected, elongated rigid ground engaging members which intersect at their ends to form a geometrically shaped treatment zone, and a plurality of rigid, but elongated upstanding members, one of said upstanding members being located at each corner intersection of said ground engaging members;

a cylindrical feeder barrel located in said treatment zone at each corner intersection of said ground engaging members near said upstanding member, each feeder barrel having a feeder opening therein in a cylindrical sidewall portion thereof arranged to face inward into said treatment zone;

an arcuate bracket member attached on each of said upstanding members and shaped to engage against said cylindrical sidewall portion of each feeder barrel;

first fastener means for attaching each feeder barrel in said treatment zone at each corner intersection to said arcuate bracket member;

a rigid brace member extending angularly between each pair of transverse, intersecting ground engaging members near each corner intersection, said brace member extending below each feeder barrel;

second fastener means for attaching the feeder barrels to the brace members; and an elongated, flexible livestock insecticide applicator suspended in an arc above the ground between the upper ends of each opposing pair of upstanding members, said insecticide applicator extending around the periphery of said treatment zone to enclose said feeder barrels therein such that the cattle must step under and brush against the insecticide applicator in order to obtain feed from a feeder barrel.

18. Cattle scrubber apparatus of claim 17, wherein said cylindrical sidewall portion is an upstanding cylindrical sidewall portion, and wherein each arcuate bracket member extends generally transversely across one of said upstanding members to engage against said cylindrical sidewall portion.

19. Cattle scrubber apparatus of claim 17, wherein each of said first and second fastener means comprises a screw.

* * * * *